UNITED STATES PATENT OFFICE.

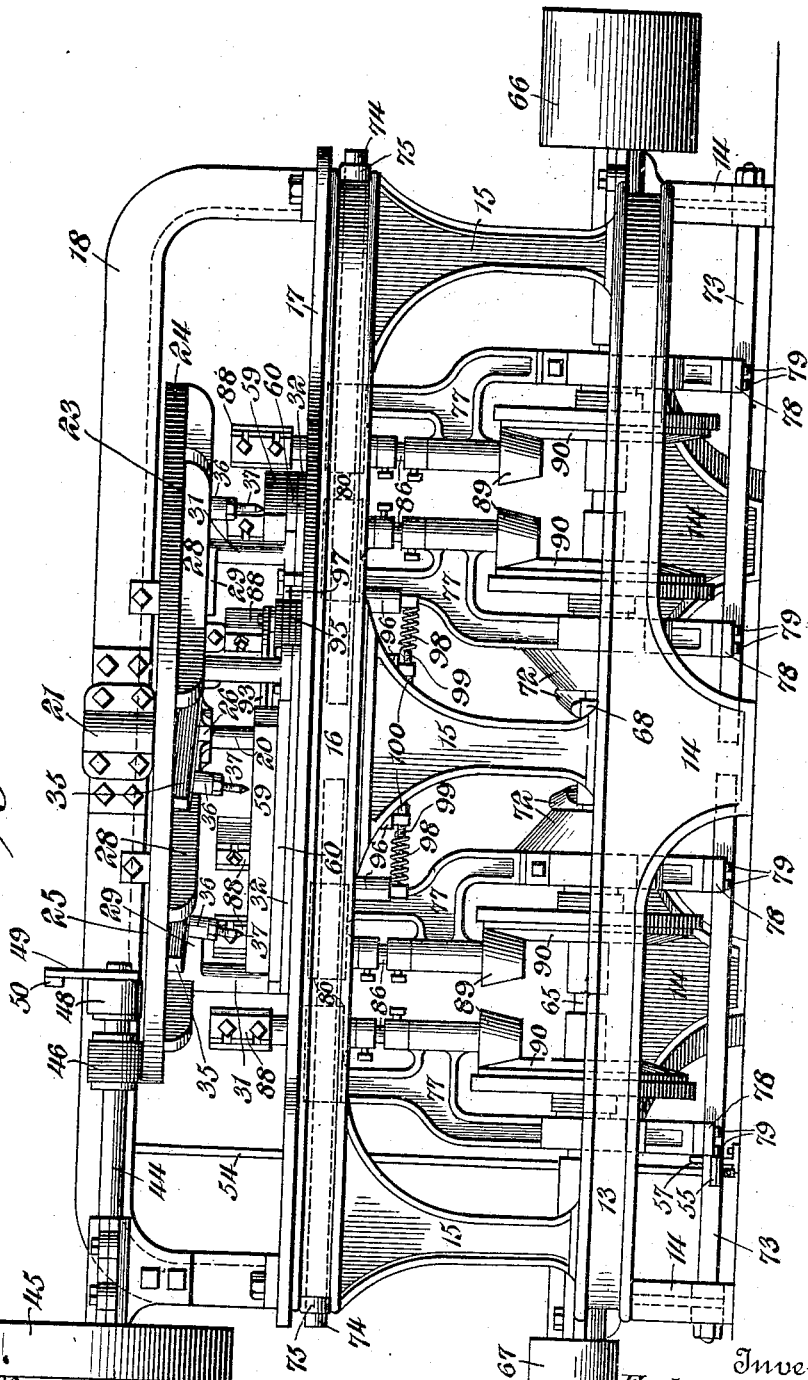

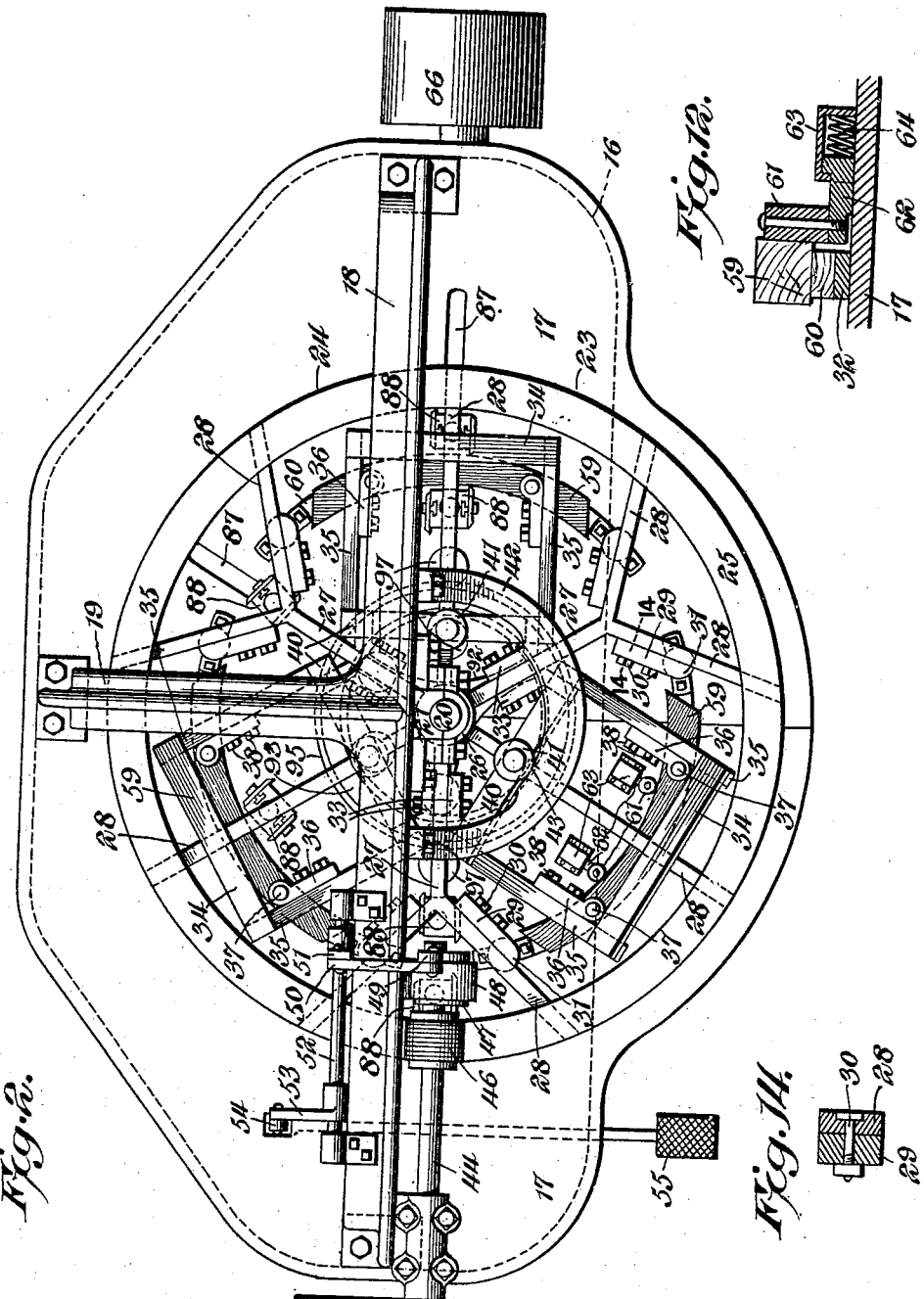

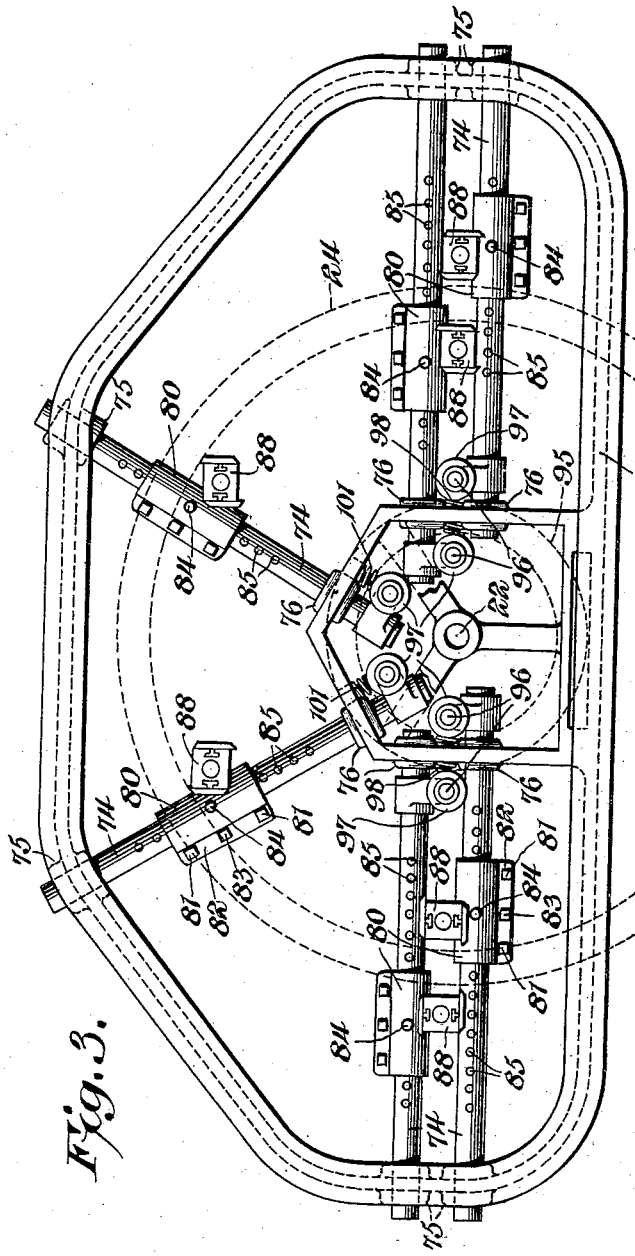

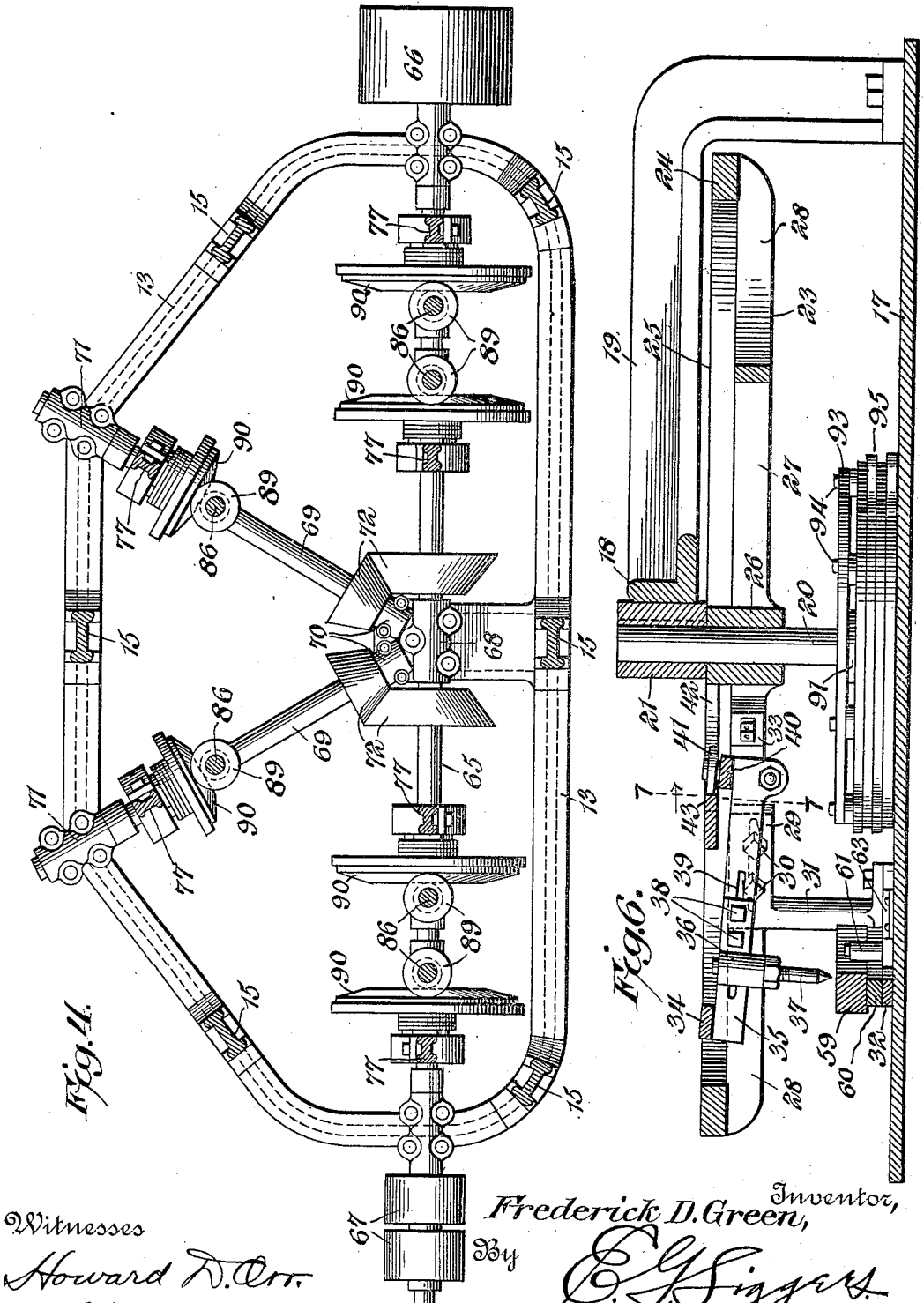

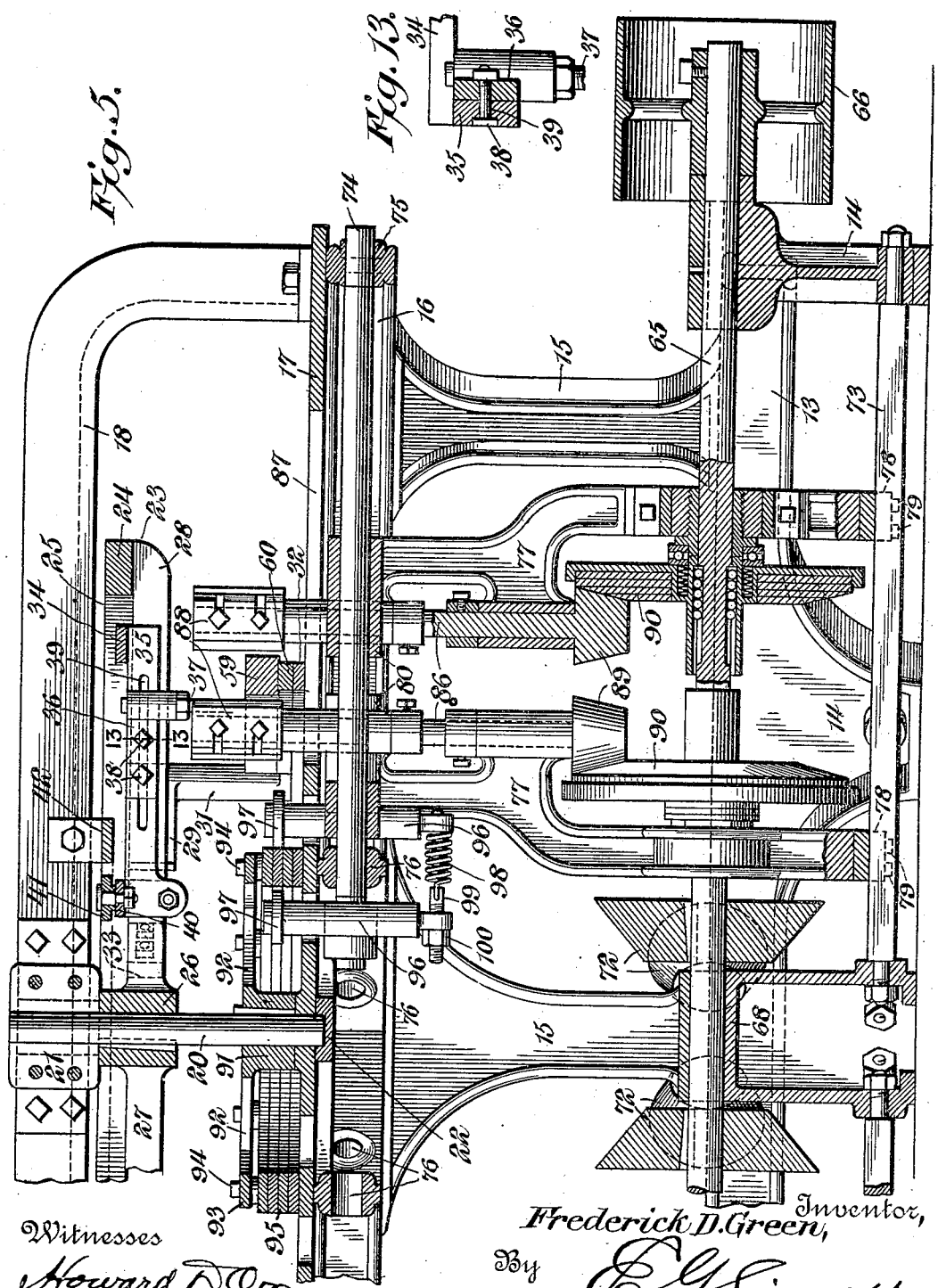

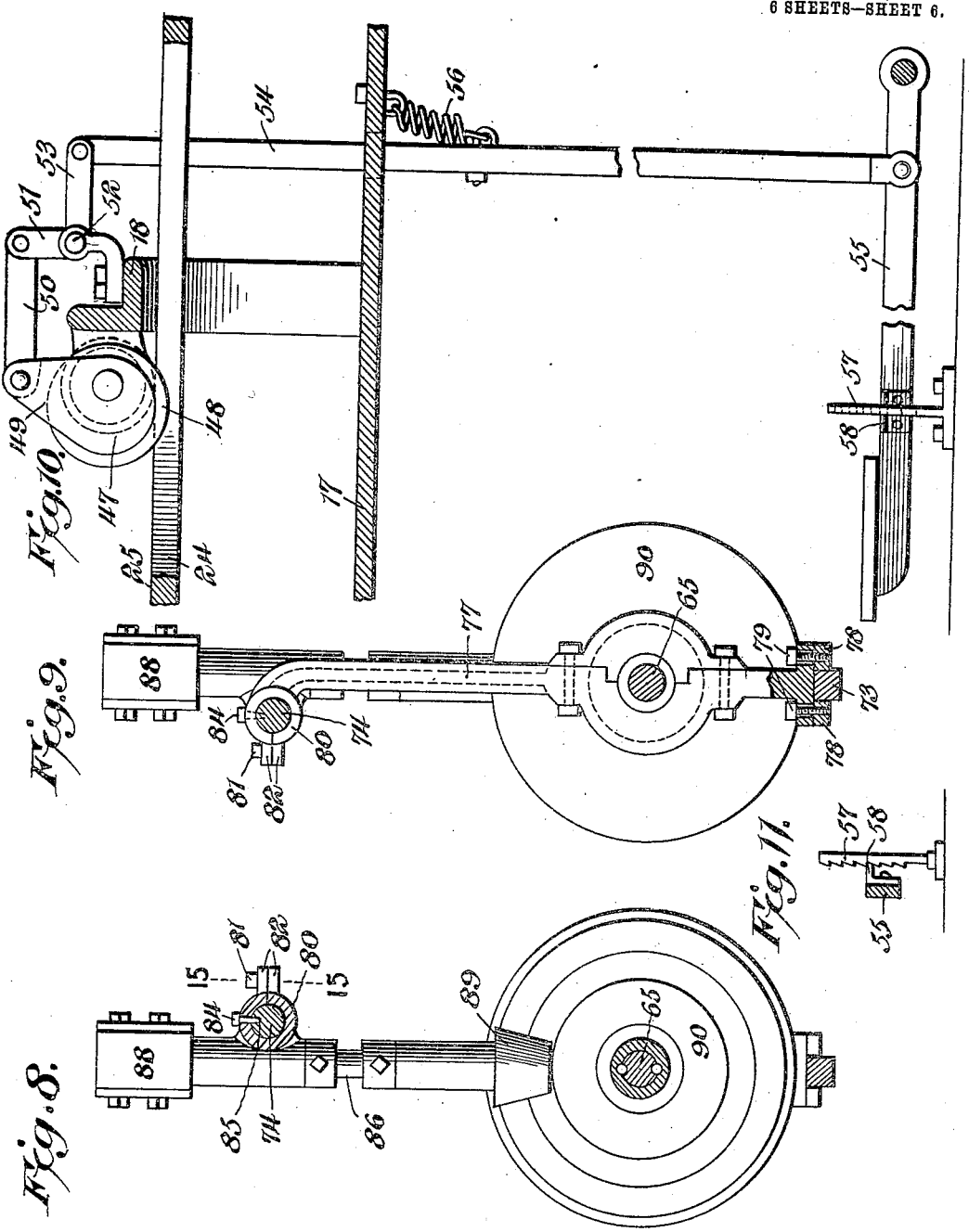

FREDERICK D. GREEN, OF CORINTH, MISSISSIPPI, ASSIGNOR OF ONE-HALF TO WILLIAM T. ADAMS, OF CORINTH, MISSISSIPPI.

WOODWORKING-MACHINE.

946,508.  Specification of Letters Patent.  Patented Jan. 11, 1910.

Application filed April 7, 1908. Serial No. 425,718.

*To all whom it may concern:*

Be it known that I, FREDERICK D. GREEN, a citizen of the United States, residing at Corinth, in the county of Alcorn and State of Mississippi, have invented a new and useful Woodworking-Machine, of which the following is a specification.

This invention relates to means for shaping articles of wood or other analogous material, and is somewhat intimately related to the machines disclosed in my Patent No. 881,793, dated March 10, 1908, and to copending application, Serial No. 409,879, filed January 8, 1908.

In both of the prior machines, the work carrier or holder is reciprocatory, and while that type of machine has proven entirely successful for certain classes of work, particularly large and heavy pieces, it is somewhat bulky for lighter grades, besides there is a loss of time during the return movement of the work carrier.

One of the objects of the present invention therefore is to provide a compact machine of a novel and simple character, in which work of various shapes can be operated upon, said machine being continuous in operation, and consequently being capable of a larger output.

A further object is to provide a machine that is readily adjustable to work of different characters and sizes. For instance, it can be employed for trimming fellies of wheels of different diameters without the necessity of altering the templet or cutter-controlling means.

A still further object is to improve certain details of construction in wood shaping machines, said improvements being clearly applicable to various types and not necessarily limited to the particular embodiment herein disclosed.

The preferred form of construction is illustrated in the accompanying drawings, wherein:—

Figure 1 is a front elevation of the machine. Fig. 2 is a top plan view thereof. Fig. 3 is a plan view of a portion of the structure, showing the arrangement of the cutter guides, and controlling means. Fig. 4 is a horizontal sectional view illustrating the driving mechanism for the cutters. Fig. 5 is a vertical sectional view through a portion of the machine. Fig. 6 is a vertical sectional view through the upper portion of the machine. Fig. 7 is a detail sectional view on the line 7—7 of Fig. 6. Fig. 8 is a vertical sectional view showing one of the cutters and its driving means. Fig. 9 is a sectional view illustrating the opposite side of the cutter and driving mechanism to that shown in Fig. 8. Fig. 10 is a sectional view illustrating more particularly the means for controlling the operation of the work carrier. Fig. 11 is a detail sectional view through the treadle bar and illustrating the holding means therefor in elevation. Fig. 12 is a sectional view through one of the work positioning devices. Fig. 13 is a detail sectional view on the line 13—13 of Fig. 5. Fig. 14 is a detail sectional view on the line 14—14 of Fig. 2. Fig. 15 is a detail sectional view on the line 15—15 of Fig. 8.

Similar reference numerals designate corresponding parts in all the figures of the drawings.

In the embodiment illustrated, a supporting frame is employed, comprising a series of sections. The lowermost or base section is in the form of a rail 13 having feet 14, and on this rail are secured standards 15 supporting another rail 16 carrying a table top 17. An arch bar 18 extends over the table top 17, and has a rearwardly extending brace 19. A vertical shaft 20, journaled in a box 21, carried by the arch bar 18 and having a lower step bearing 22 just below the table top, has a rotatable carrier frame 23 suitably secured thereto, and located in spaced relation to the table top 17. This frame constitutes the supporting portion of the work holding or carrying means. The said frame 23 comprises a circular track 24 having an upper friction face 25, said track being connected to the hub 26 of the frame by radial spokes 27 and 28. It will be observed that the outer portions of the spokes 27 comprise divergently disposed arms 28. Slidably mounted on said arms, are brackets 29 that are adjustable along the same, and are held in adjusted position by bolts 30. These brackets are provided with depending hangers 31, to which are bolted work supporting members in the form of curved plates 32. Secured to the spokes 27 are ears 33, and pivotally mounted on said ears, are clamping members in the form of swinging frames 34. These frames include outstanding arms 35, on which are adjustably mounted ears 36. In these ears are located vertically adjustable dog pins 37. The ears are held in adjusted position by bolts 38 that pass through slots 39 in the arms 35. The rear or hinged ends of the frames 34 have cross bars 40, on which are journaled rollers 41, and secured to the arch bar 18, is a cam track 42 having an inset portion 43 against which the rollers 41 successively operate upon the rotation of the carrier frame.

For the purpose of rotating the work carrier or work holding means, a drive shaft 44 is employed journaled on the arch bar 18, and having a suitable drive pulley 45 on its outer end. The inner portion carries a friction wheel 46 that operates on the friction surface 25 of the circular track 24. The inner end of the drive shaft 44 as shown more particularly in Fig. 10, is journaled in a cam 47, rotatably mounted in a suitable boxing 48 secured to the arch bar 18. This cam has an offset finger 49 connected by a link 50 to one arm 51 of a bell crank fulcrumed as shown at 52 on the arch bar 18. The other arm 53 of the bell crank is connected to an upright link 54 that extends below the rail 13, and is connected to a treadle 55. A spring 56 serves to urge the link 54 upwardly, and thus turn the cam to a position to elevate the friction wheel 46 from contact with the track 25, but a rack 57 engaging a tooth 58 on the treadle, constitutes locking means for holding the link 54 depressed, and consequently the friction wheel 46 in engagement with the track 25. With this construction therefore as long as the treadle is depressed and the wheel 46 is in engagement with the track 25, if power is applied to the shaft 44, it will rotate the same, and the carrier will be rotated. Therefore the various work holding devices will have a circular path of movement over the table top 17. As these work holding devices approach the front of the table, the rollers 41 of the upper clamping members, striking the inset portion 43 of the cam track 42, will be moved inwardly, thereby swinging the frames 34 upwardly and carrying the dogs 37 out of coaction with the work supporting plates 32. As the movement continues, the rollers 41 will ride off the inset portion 43 of the cam track and consequently the clamping frames 34 will drop. It will thus be evident that while the dogs 37 are raised, work can be placed upon the supports 32, and this work will be automatically clamped. In the present embodiment, while felly sections 59 are illustrated as being operated upon, preferably these sections rest upon wooden strips 60 secured upon the supporting plate 32. In order to properly position the sections 59 when placed upon the supports, stop rollers 61 are employed that are located directly in rear of the path of movement of the plates 32, these rollers, as will be seen by reference to Fig. 12, being carried by sliding supports 62 operating in guideways 63 and urged outwardly by springs 64. The rollers properly position the work upon the support, and yet will give slightly in case of irregularities after the work has been clamped.

The cutters and the driving mechanism therefor will now be described. Suitably journaled on the lower rail 13 of the machine is a main drive shaft 65 having a drive pulley 66 at one end and provided with suitable pulleys 67 at the other end, from which, through suitable speed reducing gearing, the shaft 44 may be driven. The main drive shaft 65 has a central bearing 68, and angularly disposed auxiliary drive shafts 69, have their inner ends journaled, as shown at 70, adjacent to the central bearing 68. The outer ends of the auxiliary drive shafts 69, are journaled in suitable boxes 71 carried by the rail 13. These various shafts, including the portions of the main drive shaft on opposite sides of the box or bearing 68, are disposed radially to the axis of rotation of the upright shaft 20, and the auxiliary drive shafts 69 are operated from the main drive shaft by coöperating friction gears 72. Angularly disposed tie rods 73 are located below the various drive shafts parallel thereto, while similarly arranged guide rods 74, located just beneath the table top 17, have their ends slidably mounted in bearings 75 in the upper rail 16, and in bearings 76 located beneath the central portion of the table top. Reciprocatory carriages 77 are located beneath the table top 17, and have their lower ends sliding on the tie rods 73. By reference to Fig. 9, it will be noted that the lower ends of each carriage have guide strips 78 adjustably fastened thereto by screws 79, said strips embracing the tie rods 73. The upper portions of the carriages are provided with split collars 80 that embrace and are slidable upon their respective guide rods 74. They are, however, adapted to be clamped against movement on the guide rods by suitable bolts 81 that pass through extensions 82 on the collars. Spreading bolts 83, located between the bolts 81, constitute means for opening the collars when the bolts 81 are loosened in order to permit the adjustment of said collars and consequently of the carriages upon the guide rods. To properly position the carriages, detachable pins 84 are preferably employed that are passed through openings in the upper sides of the collars and engage in any of a series of sockets 85 formed in the guide rods. The carriages 77 have journaled thereon, upright cutter shafts 86 that pass through slots 87 formed in the table top 17, the upper ends of said shafts carrying suitable cutter heads 88 that are located between said table top and the carrier frame 24. The lower ends of the shafts 86 are provided with friction gear wheels 89 that are engaged with other friction gear wheels 90 carried by the main and auxiliary drive shafts. The friction wheels 90 are feathered upon their respective shafts, and are movable with the carriages 77. Preferably the manner of adjusting and feathering said wheels 90 is the same as that disclosed in my co-pending application to which reference has already been made, and therefore it is believed to be unnecessary to now describe the same in detail.

In the present embodiment of the invention, it will be noted that two sets of carriages are associated with the main drive shaft, one set being located on each side of the central bearing 68. The cutters of each set are oppositely rotatable, and are movable toward and away from each other upon the corresponding movements of the carriages. Each of the auxiliary drive shafts 69 is associated with a single carriage and cutter, but it will be evident that a plurality of cutters may be driven thereby. The means for controlling the movements of the carriages and consequently of the cutters is as follows. Secured to the central upright shaft 20 is a templet holder comprising a hub 91 having radiating spokes 92 that carry a rim 93. Secured to this rim by bolts or other suitable fasteners 94, is the templet 95 preferably composed of a series of sections located one upon another. Fastened to the inner ends of the guide rods 74, are upstanding posts 96, and journaled upon the upper ends of said posts, are rollers 97 that operate against the different templet sections, these rollers being disposed at different elevations, as will be readily understood by those skilled in the art. Where a set of carriages 77 and guide rods 74 are employed, the lower ends of the upright posts 96 of said sets are connected by a spring 98, one end being directly engaged with one post, the other end being connected to a screw 99 that passes through the other post, and is adjusted and held by a suitable nut 100. This spring, by drawing the posts toward each other, holds the rollers against the templet and yet permits said rollers to be forced apart by the configuration of said templet. Consequently the movement of the carriages and of the cutters is controlled. Where a single carriage and cutter is employed, the lower end of the post has a spring 101 secured thereto, the other end of the spring being fastened to the frame of the machine.

It is believed that the operation of the machine can now be made clear. Assuming the main drive shaft 65 in operation, and consequently the shaft 44 being rotated, it will be evident that if an operator stationed at the front of the machine depresses the treadle 58, the friction roller 46 will be carried into engagement with the friction surface 25 of the track 24, and the work carrier will be revolved. At the same time, the cutters will be rotated at a high rate of speed. As a clamping frame 34 is elevated by the cam track 43 and roller 41, as already described, the operator places a piece of work in position on the support 32, and this piece of work will be clamped by the dropping of the frame 34 when the cam is passed. Almost as soon as clamped, the work passes between the first set of cutters and the templet will permit these cutters to operate upon said work as long as they cut with the grain. The work passes rearwardly through the first set, to and past the single cutters in rear, and then forwardly through the right hand set of cutters, where the operation is completed. The clamping frame 34 is again elevated, thus releasing the work, and a new piece is placed in position. Consequently, inasmuch as a plurality of work holders are employed, it will be evident that the machine is in continuous operation, and but one person is needed to tend the same. While three work carriers are shown in the present embodiment, it will be evident that this number may be greater or less, according to the work and the size of the machine. Furthermore by adjusting the work supports and dogs toward and from the axis of rotation of the work carrier and correspondingly adjusting the positions of the cutters, work of different sizes may be operated upon. For instance, if the machine is employed for trimming wheel fellies, the same can be adjusted for smaller and larger sized wheels without in any manner altering the templet. Said templet can, however, be changed whenever desired.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a machine of the character described, the combination with a support, of a circular templet holder mounted on the support, a work holder adjustable radially nearer to or farther from the templet holder, a cutter associated with the work holder, means for producing relative rotation of the cutter and work holder about the axis of the templet, and a transverse rod reciprocated by the templet and adjustably connected to said cutter to permit the cutter to be moved in accordance with the adjustment of the work holder.

2. In a machine of the character described, the combination with a support, of a rotary templet holder mounted on the support, a rotary work holder adjustable nearer to or farther from the templet holder, the two holders having a common axis of rotation, a cutter associated with the work holder, and a transverse rod reciprocated by the templet, and means for adjusting the cutter on the transverse rod nearer to or farther from the templet holder according to the adjustment of the work holder and for holding the cutter in said adjusted position.

3. In a machine of the character described, the combination with a movable work holder including means for automatically gripping and releasing the work at predetermined points in the movement of the holder and a templet holder mounted entirely to one side of and rigidly connected with the work holder, of cutters arranged on opposite sides of the work holder, each adapted to be reciprocated by the templet into coaction with the work, all of said cutters being adjustable nearer to or farther from the templet.

4. In a machine of the character described, the combination with a central templet and a work holder movable around the axis of the templet and adjustable nearer to or farther from the same, of cutters arranged on opposite sides of the work holder, each cutter adapted to be reciprocated by the templet into coaction with the work, all of the cutters being adjustable nearer to or farther from the templet.

5. In a machine of the character set forth, the combination with a support, of a work holder rotatably mounted upon the support, a templet located entirely to one side of the work holder, said work holder being adjustable radially nearer to or farther from the templet, reciprocating carriages located on both sides of the path of travel of the work holder, rotary cutters mounted on the carriages, means for reciprocating said carriages by the templet, and means for adjusting both carriages radially nearer to or farther from the templet to coact with the work holder.

6. In mechanism of the class set forth, the combination with a support, of a work holder movably mounted on the support, reciprocating rods movable transversely of the path of the work holder, a carriage movable with and by each rod and adjustable along the same, a cutter on each carriage, the cutters on certain carriages engaging with an opposite edge of the work from the cutters on certain other carriages, a templet located entirely to one side of the work and cutters, said templet acting upon the reciprocating rods to move the cutters, and means for holding the carriages adjusted upon the rods near to or farther from said templet.

7. In a machine of the character set forth, the combination with a rotary work holder having work-clamping means adjustable toward and from the axis of rotation of the work holder, of rotary cutters movable toward and from the path of movement of the work clamping means and being also adjustable so as to coöperate with said work clamping means when adjusted, and means for rotating the cutters and the work holder.

8. In a machine of the character set forth, the combination of a continuous annular templet, a plurality of work holders arranged in a circle around the templet and individually adjustable radially with respect to the latter, a cutting means operatively related with the templet and adjustable radially to coöperate with the work holders, and means for producing relative rotation between the work holders and cutting means.

9. In a machine of the character set forth, the combination of a fixed table, a rotary carrier, work holders radially adjustable on the carrier and slidable over the table, means mounted on and adjustable with the holders for clamping the work in the latter, means for automatically actuating said means to engage and release the work at predetermined points in the travel of the carrier, and a cutting device adjustable independently in a radial direction to coöperate with the work holder.

10. In a machine of the character set forth, the combination with a movable work holder, of a drive shaft, pairs of cutter shafts disposed transversely of the drive shaft, those of each pair being movable toward and from each other, gearing connecting the drive shaft with the cutter shafts, cutters mounted on the cutter shafts and located on opposite sides of the path of movement of the work holder, certain of the cutters on one side of the path of travel of the work holder rotating in one direction and certain others rotating in an opposite direction, means for moving said work holder between one pair of cutters rotating in one direction and successively between another pair of cutters rotating in the opposite direction, a double sided templet supported in coöperative relation to the work-holder and spaced from one side thereof, and separate means engaging opposite sides of the templet for moving the cutters with respect to the work holder.

11. In a machine of the character set forth, the combination with a support, of a drive shaft, a plurality of sets of carriages, the carriages of each set being movable toward and from each other longitudinally of the drive shaft, cutter shafts mounted on the carriages transversely of the drive shaft, cutters carried by the cutter shafts, friction gears connecting the drive shaft with the cutter shafts, reciprocatory guide rods secured to the carriages, a rotary work holder for carrying work successively between the cutters of the different sets, templet holding means rotatable with the work holder located to one side of the cutters and the work holder, and devices coacting with the templet holding means and connected to the guide rods for controlling the movements of the carriages.

12. In a machine of the character set forth, the combination with a support, of a rotary work holder associated therewith, a drive shaft journaled on the support and extending to positions on opposite sides of the axis of rotation of the work holder, and rotary cutters located on opposite sides of said axis and geared to said shaft, said cutters being supported on and movable along said shaft into and out of coaction with the work carried by the work holder.

13. In a machine of the character set forth, the combination with a support, of a rotary work holder journaled thereon, a main drive shaft, an auxiliary drive shaft disposed radially to the axis of rotation of the work holder, driving connections between the main and auxiliary drive shafts, carriages movable longitudinally of said shafts, cutter shafts journaled on the carriages and geared to the main and auxiliary drive shafts, and cutters carried by the cutter shafts and operating on the work secured to the work holder.

14. In a machine of the character set forth, the combination with a support, of a rotary work holder mounted thereon, a plurality of driving shafts journaled on the support disposed in angular relation to each other, carriages movable longitudinally of said shafts, and transversely of the path of movement of the work holder and cutters journaled on the carriages and operating on the work carried by the holder, said cutters being driven from the angularly disposed shafts.

15. In a machine of the character set forth, the combination with a support, of a rotary work holder mounted thereon, a plurality of shafts disposed substantially radially to the axis of movement of the work holder, and rotary cutters driven from the shafts and operating on the work carried by the holder, said cutters being movable transversely of their axes of rotation into and out of coaction with the work.

16. In a machine of the character set forth, the combination with a support, of a rotary work holder mounted thereon, a plurality of shafts disposed substantially radially to the axis of rotation of the work holder, carriages movable longitudinally of said shafts, and rotary cutters journaled on the carriages and geared to the shafts, said cutters operating on the work carried by the holder.

17. In a machine of the character set forth, the combination with a support, of a rotary work holder journaled thereon, a main drive shaft and auxiliary drive shafts disposed radially to the axis of rotation of the work holder, gearing connecting the main and auxiliary drive shafts, carriages movable longitudinally of said shafts, cutter shafts journaled on the carriages and geared to the main and auxiliary drive shafts, cutters carried by the cutter shafts and operating on the work secured to the work holder, a rotary templet holder movable with the work holder, and means connected to the carriages and coacting with the templet holder for controlling the movement of said carriages.

18. In a machine of the character set forth, the combination with a drive shaft, of carriages movable toward and from each other longitudinally of said shaft, cutter carrying shafts journaled on the carriages and geared to the shaft, a templet movable with the work and located wholly to one side of the cutters, guides secured to said carriages, transversely disposed posts secured to the guides, templet-engaging rollers journaled on the posts, and a spring connecting the posts for drawing the carriages toward each other.

19. In a machine of the character set forth, the combination with a support, of a rotary carrier frame comprising radial spokes having divergent terminal arms, work supporting means mounted on the arms, work holding dogs movably mounted on the frame and coöperating with the work supporting means, and cutters mounted on the support and operating on the work carried by the supporting means and dogs.

20. In a machine of the character set forth, the combination with a support, of a rotary carrier frame comprising radial spokes having divergent terminal arms, work supporting means mounted on the arms, work holding dogs pivotally mounted on the spokes in rear of the arms, and cutters journaled on the support and operating on the work carried by the work supporting means and dogs.

21. In a machine of the character set forth, the combination with a support, of a rotary carrier frame comprising radial spokes having divergent terminal arms, work supporting means mounted on the arms and adjustable longitudinally of the same toward and from the axis of the carrier frame, a swinging frame pivotally mounted on the spokes in rear of the arms, work holding dogs mounted on the swinging frame and coöperating with the supporting means, said dogs being adjustable on said frame toward and from the axis of the carrier frame, and cutters mounted on the support and operating on the work carried by the work supporting means and dogs.

22. In a machine of the character set forth, the combination with a support, of a rotary carrier frame having work holding means, rotary templet-holding means located between the axis of the frame and the work holding means, cutters movable toward and from the path of the work holding means, and templet engaging devices controlling the said movements of the cutters.

23. In a machine of the character set forth, the combination with a table, of an upright shaft extending above the same, a rotary carrier frame fixed to the shaft and extending over the table in spaced relation thereto and having depending work holding means, rotatable templet holding means located beneath the frame and fixed to the shaft, rotatable cutters projecting above the table and movable toward and from the path of movement of the work holding means, and templet engaging devices controlling said movements of the cutters.

24. In a machine of the character set forth, the combination with a table, of carriages located beneath the table and movable toward and from each other, guide rods connected to the carriages, rotary cutters journaled on the carriages and projecting above the table, an arch bar extending over the table above the cutters, a shaft journaled on the table and in the arch bar, a rotary work carrying frame fixed to the shaft and having work engaging means that operates between the cutters, a templet holding device secured to the shaft below the frame, and templet engaging devices secured to the guide rods and projecting above the table adjacent to the templet holding means.

25. In a machine of the character set forth, the combination of a circular templet, cutters controlled thereby, a work holder having a circular path of movement around the axis of the templet, clamping devices rotating with the holder, and an annular cam arranged concentrically with respect to the axis of rotation of the holder for automatically releasing the clamping devices from the work at a predetermined point in the movement of the work holder.

26. In a machine of the character set forth, the combination of a single shaft disposed in upright position, a rotary carrier mounted thereon, a rotary templet also mounted on the shaft, a plurality of individually adjustable work holders on the carrier movable toward and away from the shaft, means for operatively relating the work holders with the templet, and automatically-actuated work-clamping devices for engaging and releasing the work at predetermined points in the movement of the carrier.

27. In a machine of the character set forth, the combination with a table, of carriages movably mounted beneath the table, cutters journaled on the carriages and projecting above the table, a rotary work holder, and a rotary templet holder operating above the table, and templet engaging means connected to the carriages and projecting above the table adjacent to the path of movement of the templet holder.

28. In a machine of the character set forth, the combination with a table, of a rotary work holder operating over the table, reciprocatory guide rods operating beneath the table and disposed substantially radial to the axis of the work holder, carriages fixed to the guide rods, upright cutters journaled on the carriages and projecting above the table top, said cutters being movable toward and from the path of movement of the work holder, a templet holder rotatable with the work holder and operating between the axis of said templet holder and the work holder, and templet engaging devices secured to the guide rods and projecting above the table adjacent to the templet holder.

29. In a machine of the character set forth, the combination of a rotary work holder, cutters arranged to operate on opposite sides of the work in the holder, a work-clamping dog passing between the cutters, a pivoted support for the dog mounted to rotate with the holder, and means for automatically tilting the support to engage or release the dog with respect to the work.

30. In a machine of the character set forth, the combination of a table, a shaft rising therefrom, a carrier mounted on the shaft, a plurality of work holders depending from the carrier and rotatable on the table, cam-actuated work-engaging devices on the carrier for releasably holding the work in said holders, a plurality of cutters mounted in coöperative relation with the holders, and a mechanism for continuously driving the carrier together with the holders and work-engaging devices.

31. In a machine of the character set forth, the combination with a supporting frame, of a rotatable carrier frame, a plurality of rotary cutters movable toward and from the axis of rotation of the carrier frame, means for effecting the automatic movement of said cutters, means for rotating the cutters, means for adjusting the cutters toward and from the axis of rotation of the carrier frame, and work clamping mechanism mounted on the carrier frame and adjustable toward and from the axis of rotation of said frame.

32. In a machine of the character set forth, the combination with a supporting frame, of a table top carried thereby, a rotary carrier frame journaled on the supporting frame over the table top, a plurality of drive shafts disposed radially to the axis of rotation of the carrier frame, carriages movable longitudinally of said shafts, cutter shafts journaled on the carriages and having cutters located above the table top and below the carrier frame, friction gear connections between the various shafts, a plurality of sets of work clamping members suspended from the carrier frame and movable successively past the cutters to carry the work successively past the same, each set having a swinging member, and a cam located in the path of movement of the members for successively swinging the same when they reach a predetermined position.

33. In a machine of the character described, the combination with a support, of a work holder movable on the support, a transversely reciprocating cutter mounted on one side of the path of movement of the work holder, a transversely reciprocating cutter mounted on the other side of said path of movement, a templet having opposed inside and outside pattern edges, and located to one side of the work holder, a rod connected to one of the cutters and engaging with the outer edge of the templet, and a rod connected to the other cutter and engaging with the inner edge of the templet.

34. In a machine of the character described, the combination with a support, of a work holder movable on the support, a templet mounted to one side of said work holder and having opposed inside and outside pattern edges, a series of cutters mounted on one side of the path of movement of the work holder, a series of cutters mounted on the opposed side of said path of movement, and rods connected one to each of the cutters on one side of said path of movement and engaging with the outer edge of the templet, and rods connected each to one of the cutters on the other side of said path of movement and engaging with the inner edge of the templet.

35. In a machine of the character described, the combination with a support, of a central rotatable templet, a plurality of work holders mounted radially from the templet and concentrically moving therewith, means for independently adjusting the work holders radially toward or from the templet, transversely reciprocating cutters mounted on the inside and on the outside of the path of movement of said work holder, and reciprocating rods connected one to each of the cutters, the rods connected to the outermost cutters engaging with the outer edge of the templet and the rods connected to the innermost cutters engaging with the inner edge of the templet, each cutter being adjustable on its respective rod longitudinally thereof and substantially radially with respect to the templet.

36. In a machine of the character described, the combination with a support, of a central templet having inside and outside pattern edges, a work holder radially mounted from said templet and rotatable therewith, said work holder being adjustable radially nearer to or farther from the templet, a series of rotary cutters mounted on the inside of the path of movement of the work holder, a series of cutters mounted on the outside of the path of movement thereof, both series of cutters being adjustable in a radial direction toward or away from the templet, means for drawing said cutters toward each other, rods connected one to each of the outside cutters and engaging with the outer edge of the templet, and rods connected one to each of the inside cutters and engaging with the inner edge of the templet.

37. In a machine of the character set forth, the combination with a support, of a central templet having opposed inside and outside pattern edges, a work holder radially mounted from the templet and moving concentrically therewith, means for adjusting the holder inwardly or outwardly in a radial direction, a work clamping device carried by the holder, means for automatically opening and closing the clamping device at predetermined points in the movement of the holder, a series of cutters mounted on the inside of the path of movement of the work holder, certain of said cutters rotating in one direction and certain in the other direction, a series of cutters on the outside of said path of movement, certain of the cutters rotating in one direction and certain others in an opposite direction, and means for reciprocating said cutters by the templet, said means engaging respectively with the outer and inner edges of the templet.

In testimony, that I claim the foregoing as my own, I have hereto affixed my signature in the presence of two witnesses.

FREDERICK D. GREEN.

Witnesses:
  H. E. MEEKS,
  J. C. SWAIM, Jr.